US010811666B2

(12) United States Patent
Hsu

(10) Patent No.: US 10,811,666 B2
(45) Date of Patent: Oct. 20, 2020

(54) INSULATING CASING FOR BATTERY TERMINALS

(71) Applicant: MOBILETRON ELECTRONICS CO., LTD., Taichung (TW)

(72) Inventor: Ming-Hung Hsu, Taichung (TW)

(73) Assignee: MOBILETRON ELECTRONICS CO., LTD., Taichung (TW)

(*) Notice: Subject to any disclaimer, the term of this patent is extended or adjusted under 35 U.S.C. 154(b) by 203 days.

(21) Appl. No.: 15/961,452

(22) Filed: Apr. 24, 2018

(65) Prior Publication Data

US 2019/0221826 A1     Jul. 18, 2019

(30) Foreign Application Priority Data

Jan. 16, 2018 (TW) .............................. 107101555 A

(51) Int. Cl.
    *H01M 2/30*         (2006.01)
    *H01M 2/10*         (2006.01)

(52) U.S. Cl.
    CPC ......... *H01M 2/305* (2013.01); *H01M 2/1077* (2013.01)

(58) Field of Classification Search
    CPC ........................... H01M 2/1077; H01M 2/305
    See application file for complete search history.

(56) References Cited

U.S. PATENT DOCUMENTS

2013/0164599 A1*    6/2013    Kim ..................... H01M 2/1077
                                                                  429/158

2013/0288105 A1*    10/2013    Niedzwiecki ....... H01M 2/1077
                                                                  429/156
2018/0277969 A1*    9/2018    Yaita .................... H01R 11/288

FOREIGN PATENT DOCUMENTS

JP      2014233160 A    * 12/2014            H01M 2/206
JP      2017069168 A      4/2017
TW     201230573 A      7/2012

OTHER PUBLICATIONS

English Abstract for Japan patent document 2017069168, publication date Apr. 6, 2017, total of 1 page.
English Abstract for Taiwan patent document 201230573, publication date Jul. 16, 2012, total of 1 page.
Taiwan Examination Report for patent application No. 107101555 dated Jul. 30, 2018, total of 5 pages.
Taiwan Search Report for patent application No. 107101555 dated Jul. 30, 2018, total of 1 page.

* cited by examiner

*Primary Examiner* — Basia A Ridley
*Assistant Examiner* — Heng M. Chan
(74) *Attorney, Agent, or Firm* — R. Lynette Wylie; Apex Juris, pllc.

(57) ABSTRACT

An insulating casing for battery terminals including a base and a top cover, wherein the base is engaged with a battery pack and includes a bottom plate. The bottom plate has a plurality of perforations adapted to be passed through by the terminals of the battery pack. The top cover is detachably engaged with the base, and a chamber communicating with the perforations is formed between the top cover and the base, and the terminals are received into the chamber whereby an insulating casing to protect the terminals of the battery pack is provided.

6 Claims, 12 Drawing Sheets

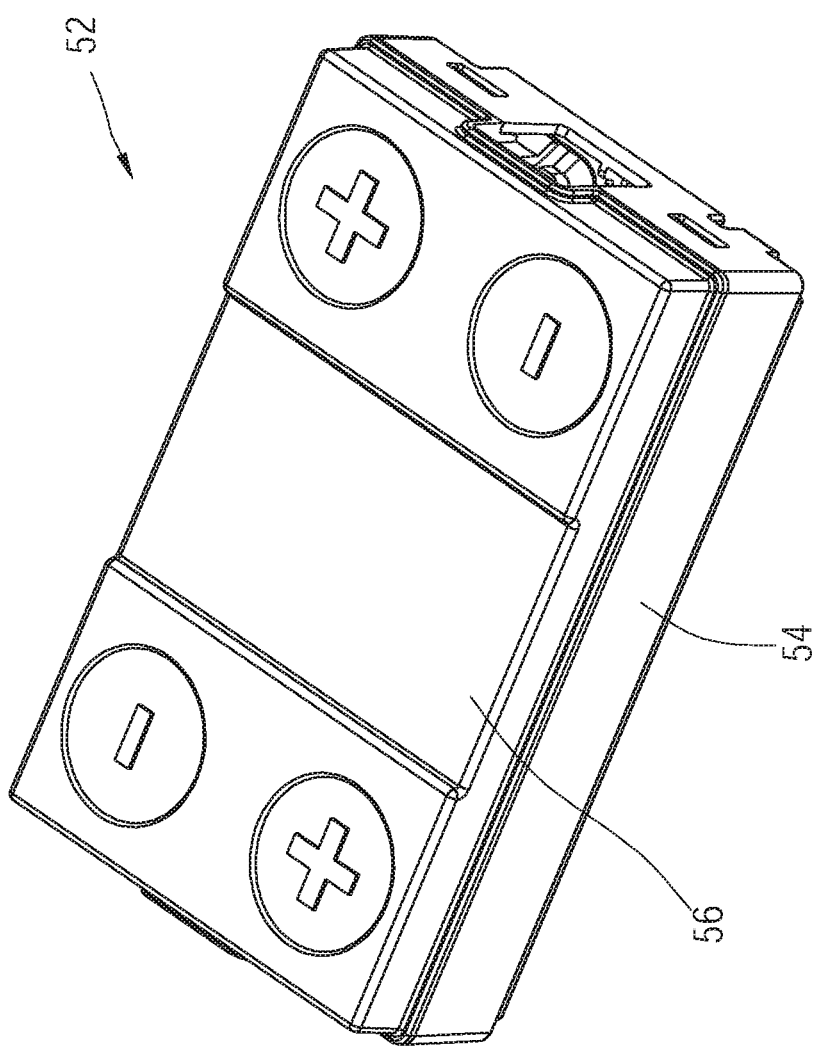

US 10,811,666 B2

INSULATING CASING FOR BATTERY TERMINALS

BACKGROUND OF THE INVENTION

Technical Field

The present invention is related to a battery pack, and more particularly to an insulating casing for battery terminals.

Description of Related Art

With the advancement in technology, the demand for electricity is increasing. Power supplies such as alternating current or battery packs consisting of a plurality of connected battery modules could be utilized to supply a large amount of electricity. The advantage of battery packs is that the power supply could be movable and would not be limited to a fixed location.

Conventional battery packs usually have battery terminals which are exposed to the exterior and could be electrically connected with each other by a user with conductive members to achieve the desired voltage or current. However, the exposed terminals are risky, for example, the exposed terminals could be contaminated or oxidized because of dust adhesions, resulting in some problems such as contact failure, and positive terminals and negative terminals of the battery modules would be short-circuited, burn and even explode when metal objects fall on and contact the terminals. Moreover, an electric shock may occur when the user touches the terminals accidentally.

Hence, it is required to improve the design of the conventional battery packs.

BRIEF SUMMARY OF THE INVENTION

In view of the above, an object of the present invention is to provide an insulating casing for battery terminals to protect the terminals of battery packs.

To achieve the object mentioned above, the present invention provides an insulating casing for battery terminals, wherein the insulating casing is adapted to be disposed on a battery pack which has a plurality of terminals. The insulating casing includes a base and a top cover, wherein the base is adapted to be engaged with the battery pack and includes a bottom plate, wherein the bottom plate has a plurality of perforations penetrating through the bottom plate and communicating with two opposite surfaces thereof; the perforations are adapted to be passed through by the terminals. The top cover is detachably engaged with the base, wherein a chamber communicating with the perforations is formed between the top cover and the base.

The advantage of the present invention is that the insulating casing could cover the terminals of the battery pack effectively, thereby preventing the terminals from being exposed, contaminated, oxidized and even short-circuited.

BRIEF DESCRIPTION OF THE SEVERAL VIEWS OF THE DRAWINGS

The present invention will be best understood by referring to the following detailed description of some illustrative embodiments in conjunction with the accompanying drawings, in which:

FIG. 12 is a perspective view of the second insulating casing of FIG. 9.

DETAILED DESCRIPTION OF THE INVENTION

Figure 1:
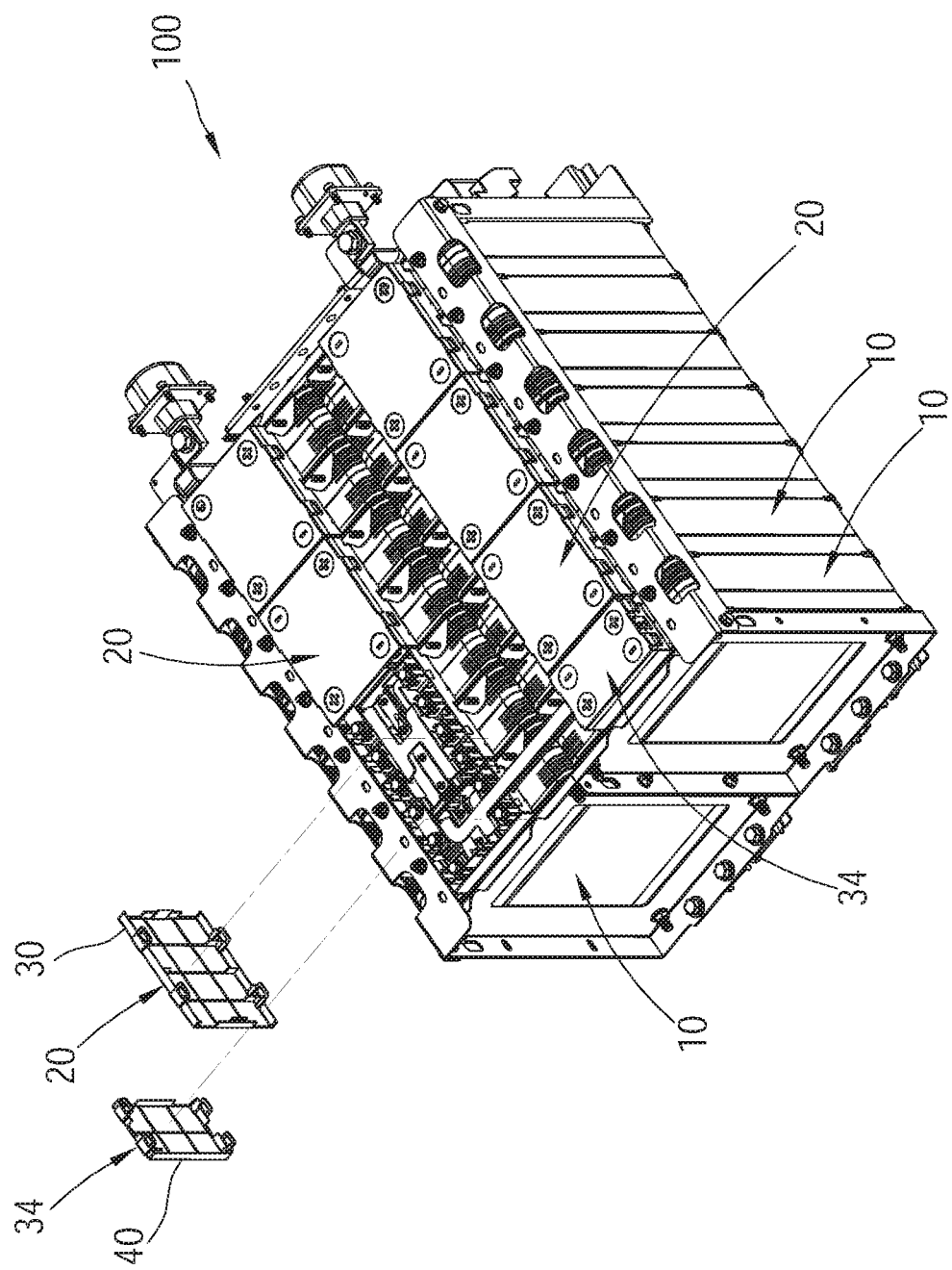
FIG. 1 is a perspective view of a battery pack of a first embodiment according to the present invention.
Figure 2:
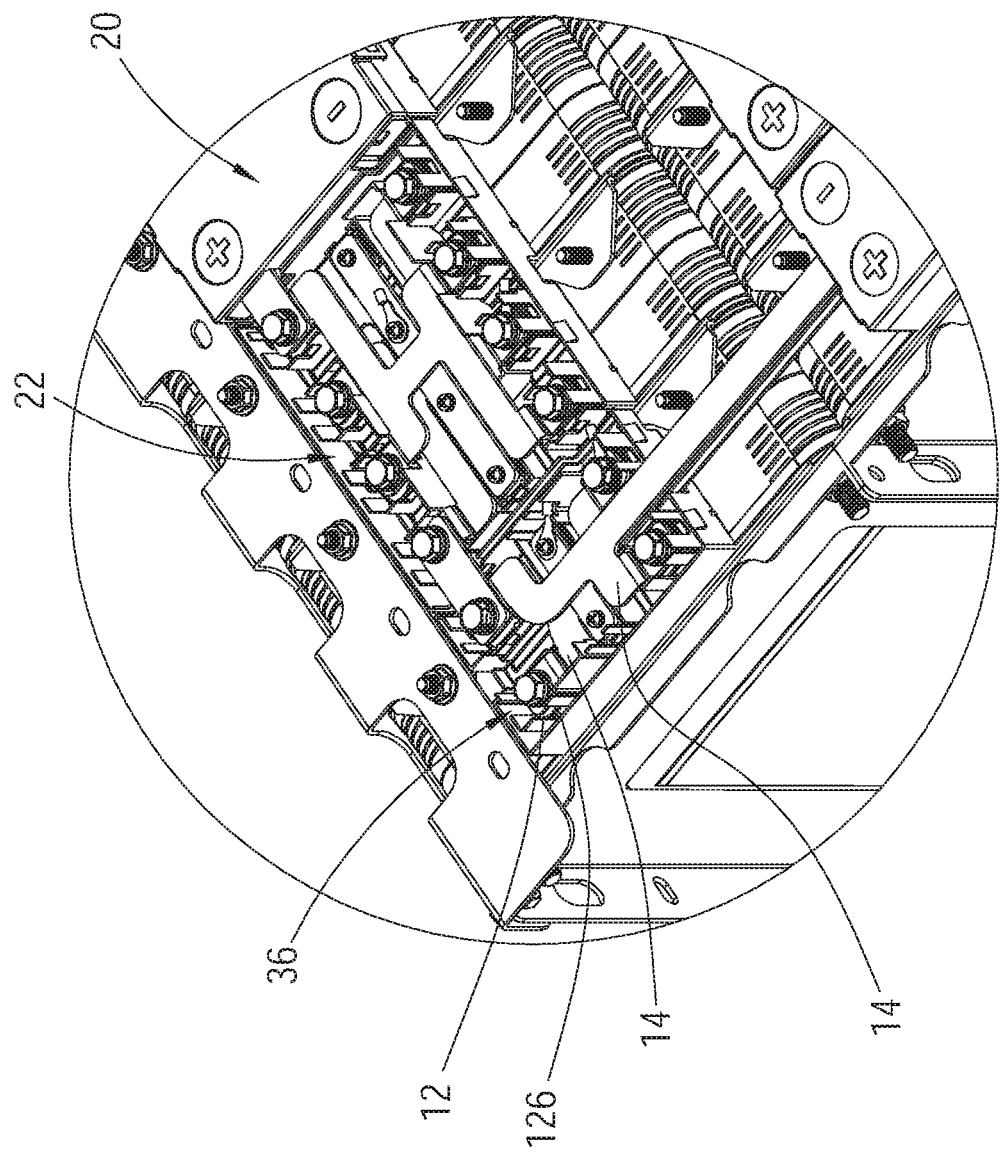
FIG. 2 is a partial enlarged view of the battery pack of FIG. 1.
Figure 3:
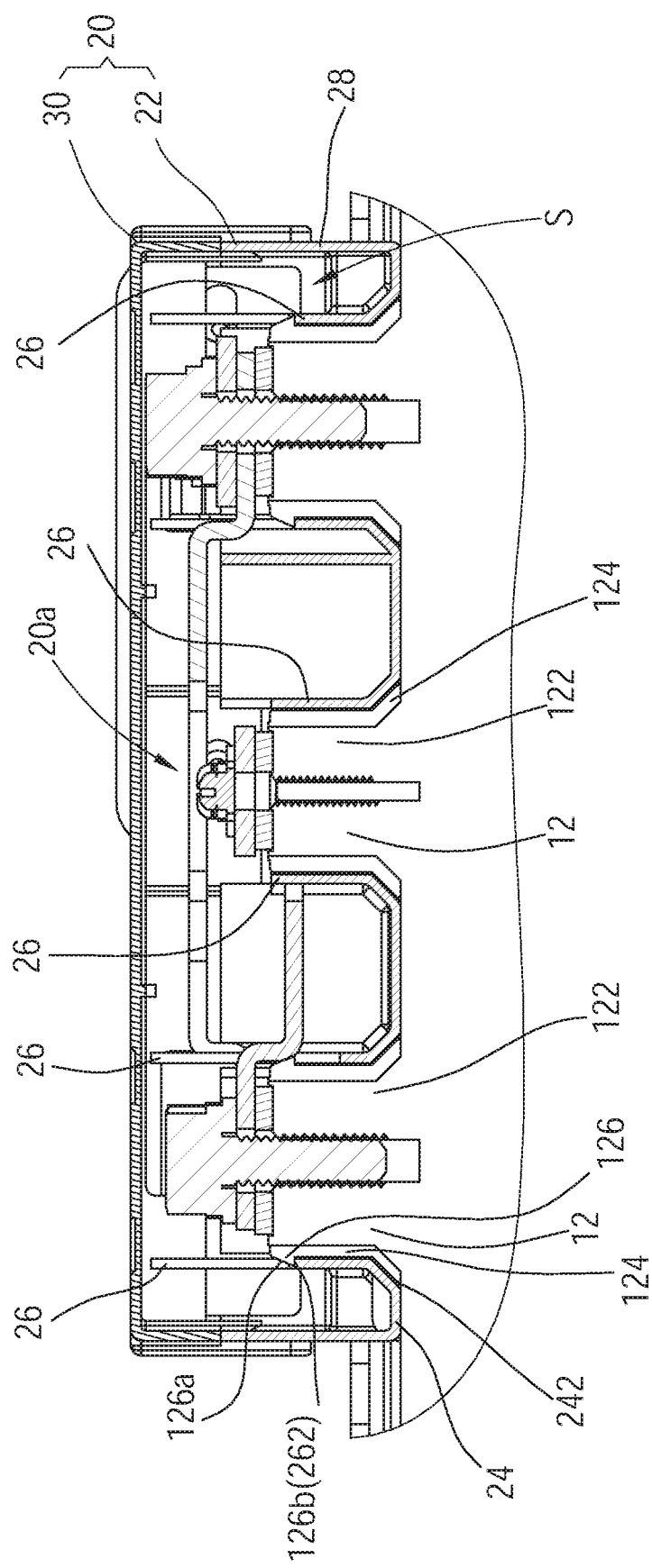
FIG. 3 is a schematic view showing that the terminals are disposed in the chamber of the first insulating casing.

The following illustrative embodiments and drawings are provided to illustrate the disclosure of the present invention, these and other advantages and effects can be clearly understood by persons skilled in the art after reading the disclosure of this specification. As shown in FIG. 1 to FIG. 3, a battery pack 100 disposed with a plurality of insulating casings of a first embodiment according to the present invention is illustrated. The battery pack 100 includes a plurality of battery modules 10, and the plurality of battery modules 10 include a plurality of terminals 12. Each of the terminals 12 has a cylindrical shape and includes a conductive post 122 and an insulating layer 124, wherein the insulating layer 124 is formed around the conductive post 122, and a top surface of the conductive post 122 is connected to a conductive sheet 14. Each of the insulating layers 124 of at least a part of the terminals 12 includes at least one positioning block 126, and the positioning block 126 has an inclined surface 126a and a blocking surface 126b, wherein the inclined surface 126a is inclined outwardly in a direction away from the insulating layer 124, and the blocking surface 126b is connected to a bottom of the inclined surface 126a.

The insulating casings are adapted to isolate the terminals 12 from the external environment, and more particularly to protect the conductive sheets 14 on the conductive posts 122 and the terminals 12. The battery pack 100 is disposed with the plurality of insulating casings, and the plurality of insulating casings are divided into two types: a first insulating casing 20 and a second insulating casing 34. The difference is that the first insulating casing 20 could receive more terminals 12 than the second insulating casing 34.

Figure 4:
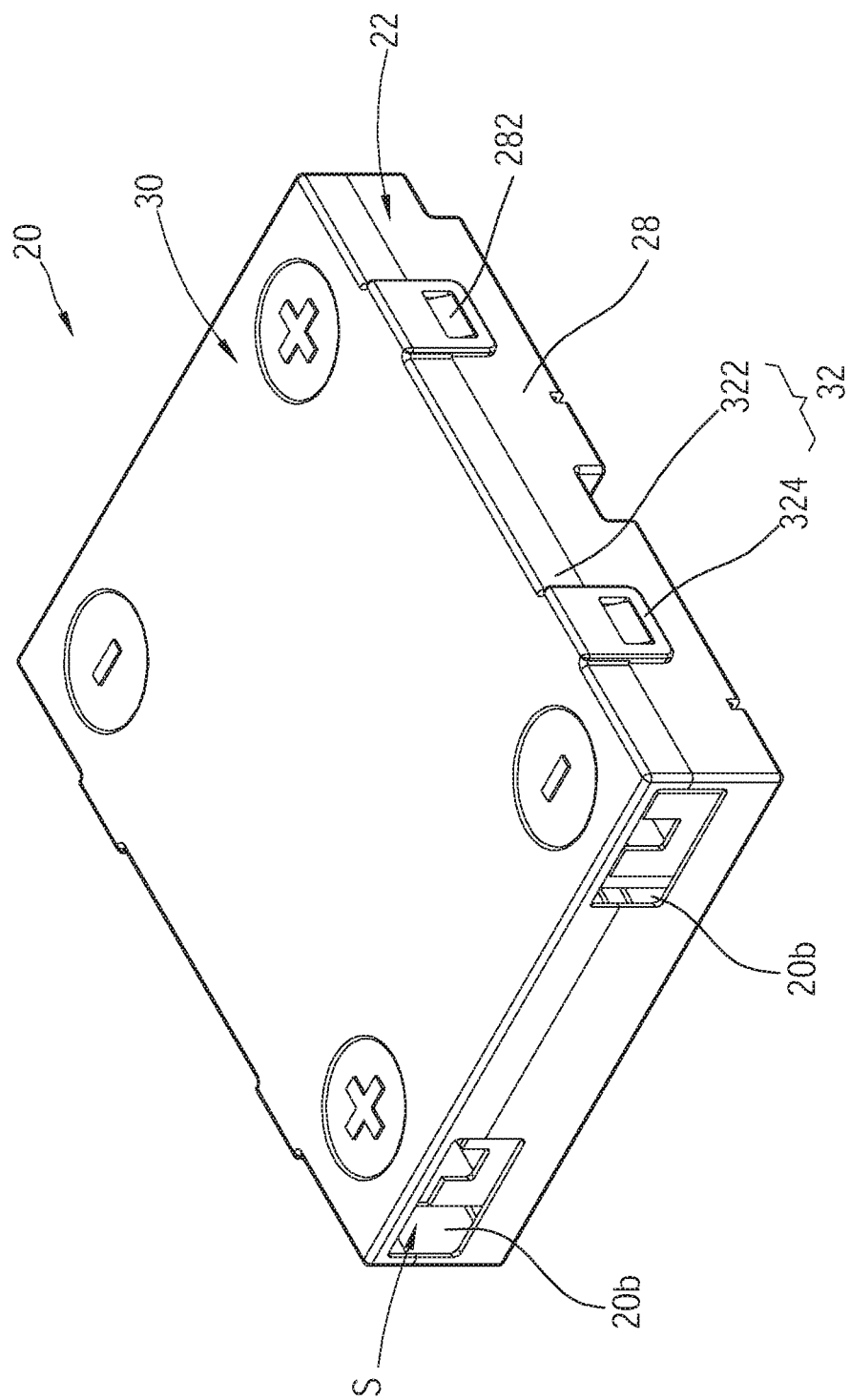
FIG. 4 is a perspective view of the first insulating casing of FIG. 1.
Figure 5:
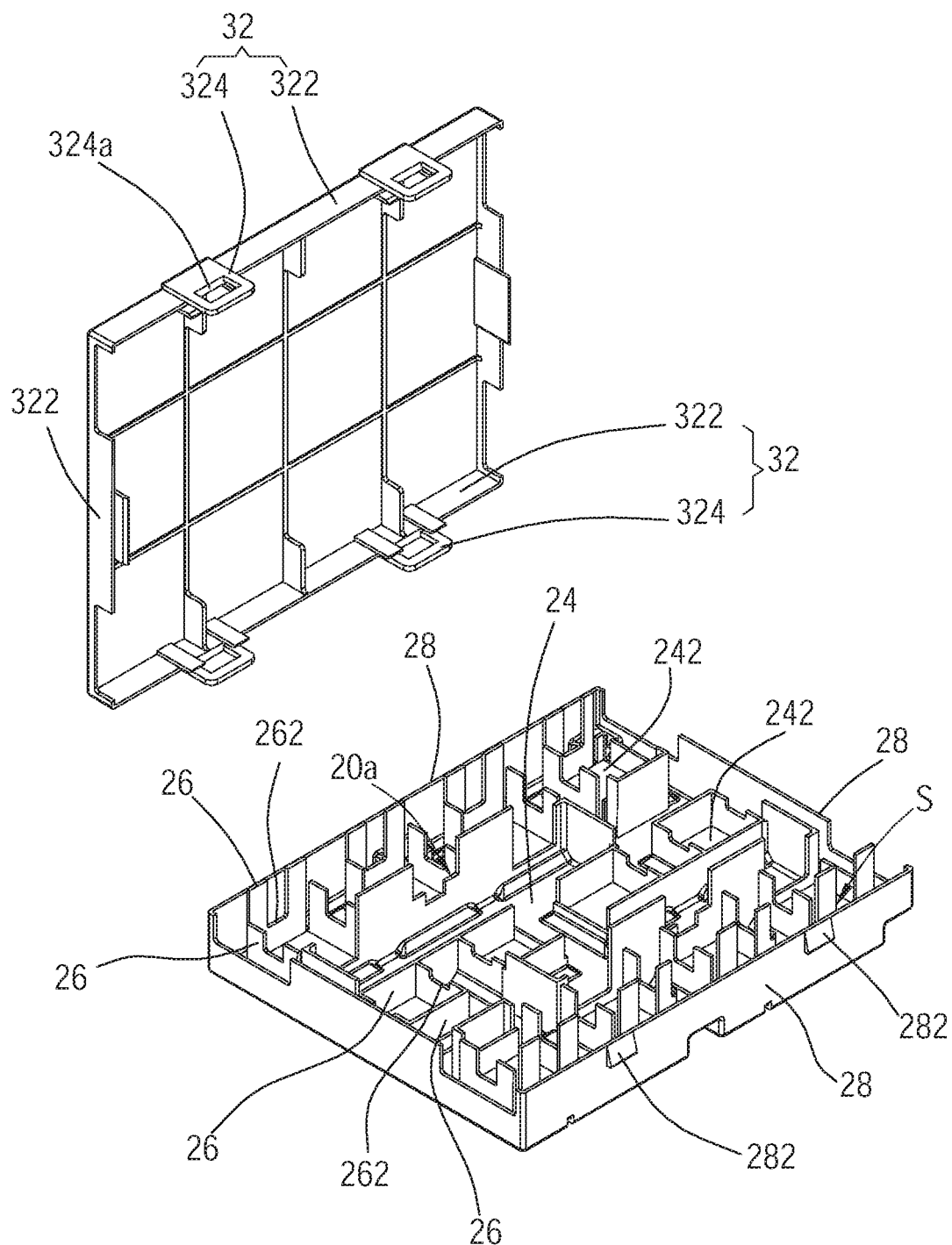
FIG. 5 is an exploded perspective view of the first insulating casing of FIG. 1.
Figure 6:
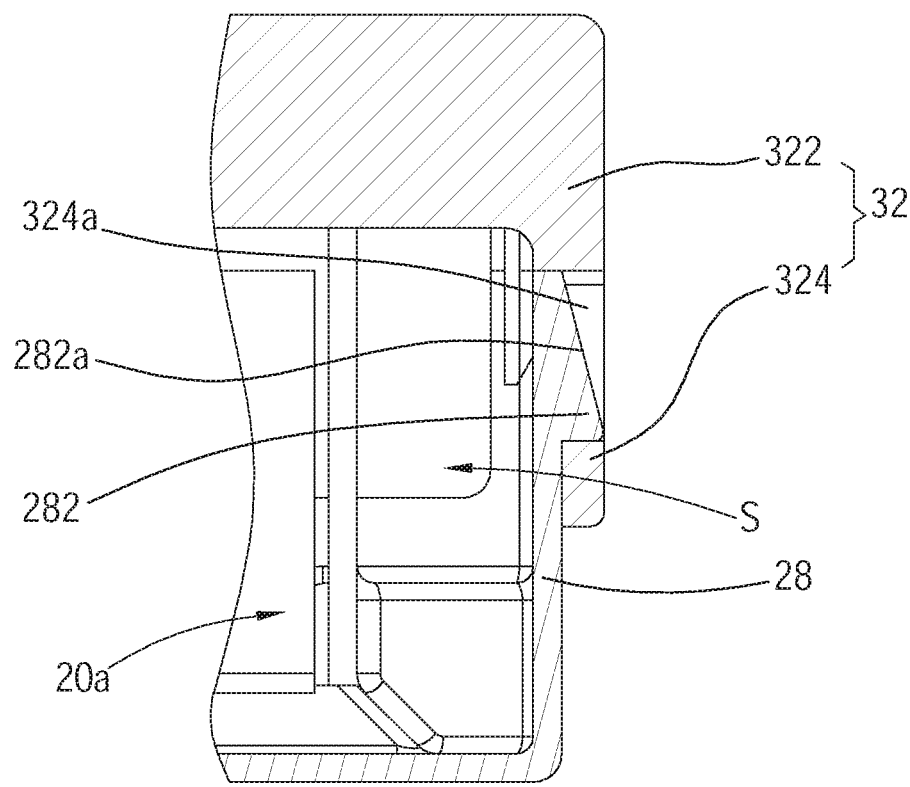
FIG. 6 is a schematic view showing the engagement between the top cover and the base.

Referring to FIG. 4 to FIG. 6, the first insulating casing 20 includes a base 22 and a top cover 30, wherein the base 22 is adapted to be engaged with the battery pack 100 and includes a bottom plate 24. The bottom plate 24 has a plurality of perforations 242 penetrating through the bottom plate 24 and communicating with two opposite surfaces thereof. The perforations 242 are adapted to be passed through by the terminals 12. When the terminals 12 pass through the perforations 242 of the base 22, the conductive sheets 14 could be mounted on the terminals 12, whereby the terminals 12 could be electrically connected to one another.

The base 22 has four lower side walls 28 which are connected to a periphery of the bottom plate 24, wherein each of two opposite lower side walls 28 has at least one first engaging portion which is one of a protrusion and a recess. In this embodiment, each of the two opposite lower side walls 28 has two first engaging portions, and the first engaging portions are protrusions 282 protruding outwardly from the lower side walls 28, wherein each of the protrusions 282 has an inclined surface 282a.

The top cover 30 is detachably engaged with the base 22, and a chamber 20a communicating with the perforations 242 of the base 22 is formed between the top cover 30 and the base 22. The terminals 12 could be received into the chamber 20a via the perforations 242 of the base 22. The top cover 30 has four upper side walls 32 corresponding to the lower side walls 28, wherein each of two opposite upper side walls 32 has at least one second engaging portion which is another one of the protrusion and the recess. In this embodiment, each of the two opposite upper side walls 32 has two second engaging portions, and the second engaging portions are recesses 324a. Each of the two upper side walls 32 includes a main body 322 and at least one extending plate 324. In this embodiment, each of the two upper side walls 32 includes two extending plates 324 extending downward from the main body 322, wherein each of the two extending plates 324 has one of the recesses 324a which forms the second engaging portion. Wherein, the top cover 30 could be engaged with the base 22 by aligning the top cover 30 corresponding to the base 22 and moving the extending plates 324 of the upper side walls 32 downward along the inclined surface 282a of the protrusions 282 on outside of the lower side walls 28 such that each of the protrusions 282 is wedged into one of the recesses 324a of the extending plates 324, and each of the upper side walls 32 abuts against the corresponding lower side wall 28. In addition, the first insulating casing 20 has a plurality of openings 20b disposed therearound to be passed through by the conductive sheets 14.

In this embodiment, the bottom plate 24 has twelve perforations 242, and the perforations 242 of the bottom plate 24 are arranged in a matrix form. A plurality of partitions 26 are disposed around a peripheral edge of each of the perforations 242 of the bottom plate 24, wherein the partitions 26 are located in the chamber 20a between the top cover 30 and the base 22 and abut against the insulating layer 124 on the lateral side of the corresponding terminal 12. The blocking surface 126b of the positioning block 126 abuts against the partitions 26, whereby to fix the base 22 on the battery pack 100. More specifically, at least a part of the partitions 26 have positioning notches 262, each of which is recessed in a direction from a top edge of the corresponding partition 26 toward the bottom plate 24, and the blocking surface 126b of the positioning block 126 abuts against a bottom of the corresponding positioning notch 262, and each of the partitions 26 is engaged with one of the terminals 12, whereby to prevent the first insulating casing 20 from moving in a lateral direction.

A space S is formed between the lower side walls 28 and the adjacent partitions 26 and adapted to be passed through by signal wires (not shown), whereby to isolate the signal wires from the terminals 12 and the conductive sheets 14.

Figure 7:
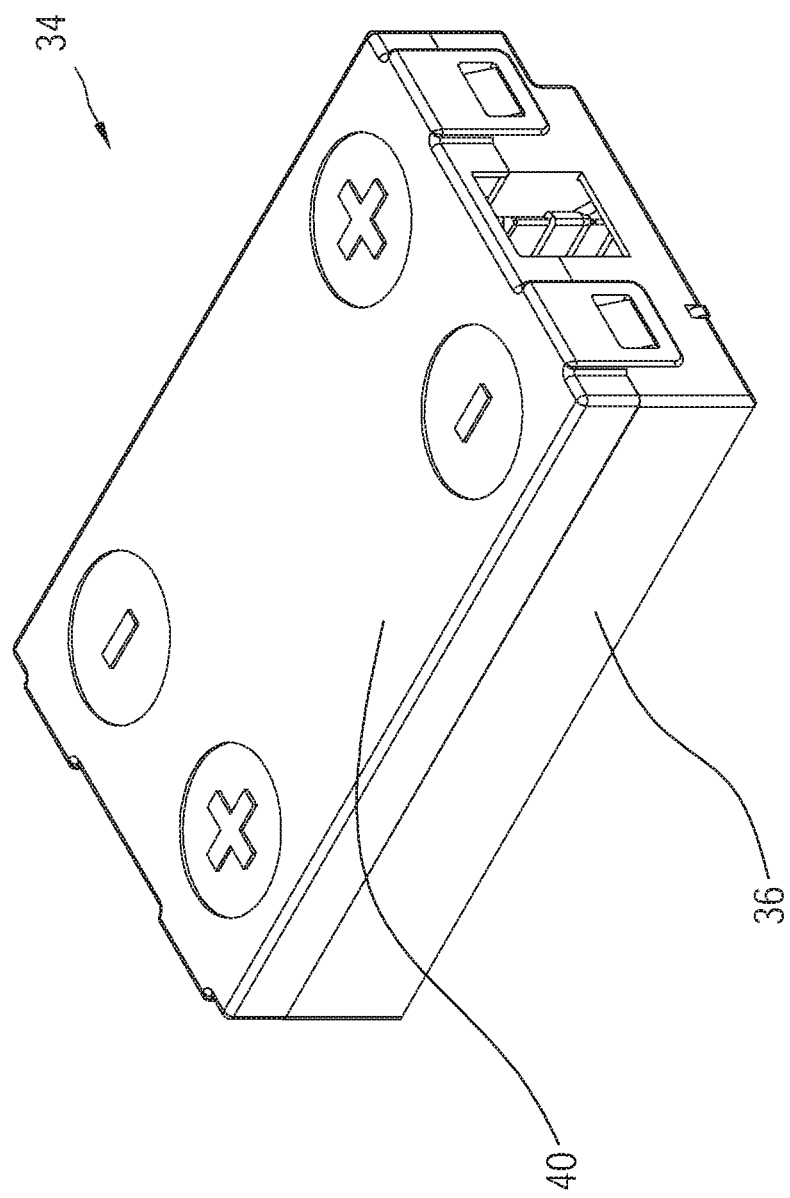
FIG. 7 is a perspective view of the second insulating casing of FIG. 1.
Figure 8:
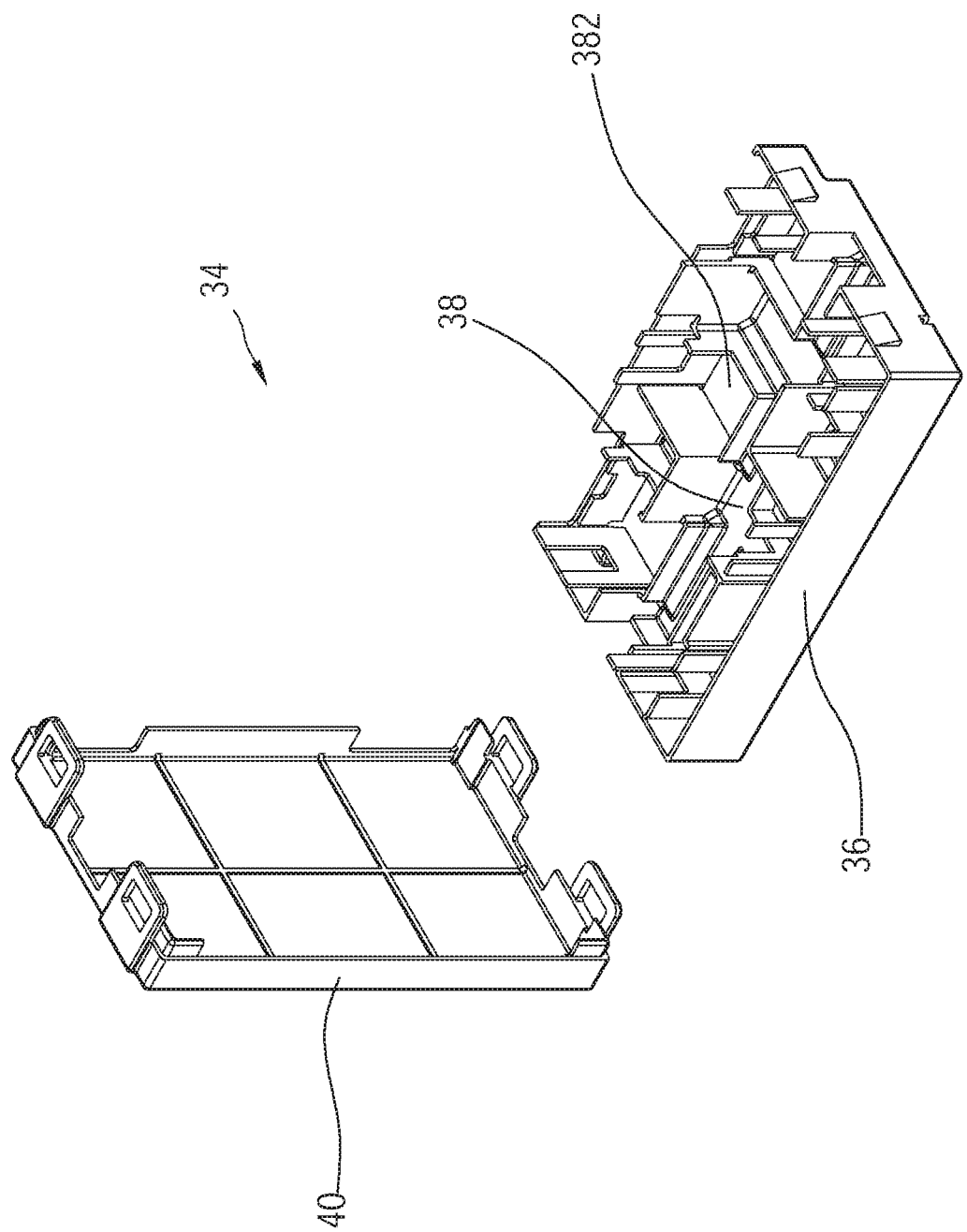
FIG. 8 is an exploded perspective view of the second insulating casing of FIG. 1.

As shown in FIG. 7 and FIG. 8, the second insulating casing 34 has a structure similar to the first insulating casing 20 and includes a base 36 and a top cover 40 as well, except that the bottom plate 38 has only six perforations 382.

Figure 9:
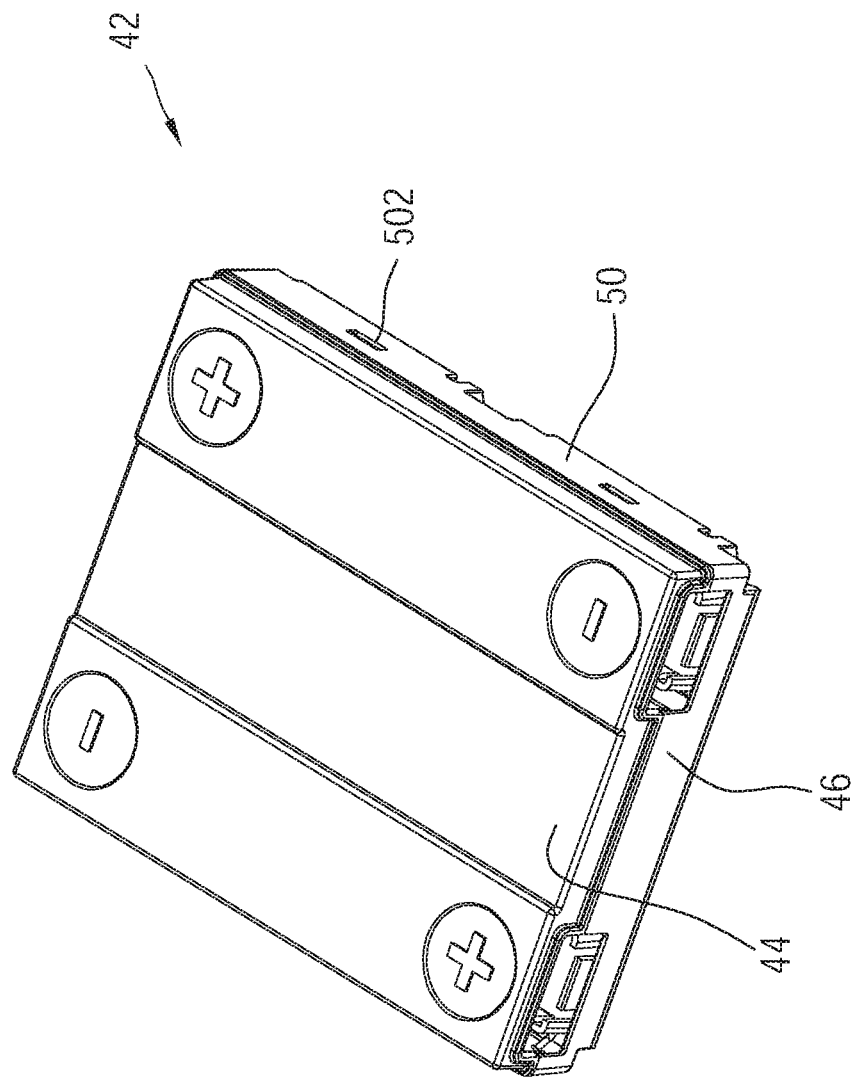
FIG. 9 is a perspective view of a first insulating casing of a second embodiment according to the present invention.
Figure 10:
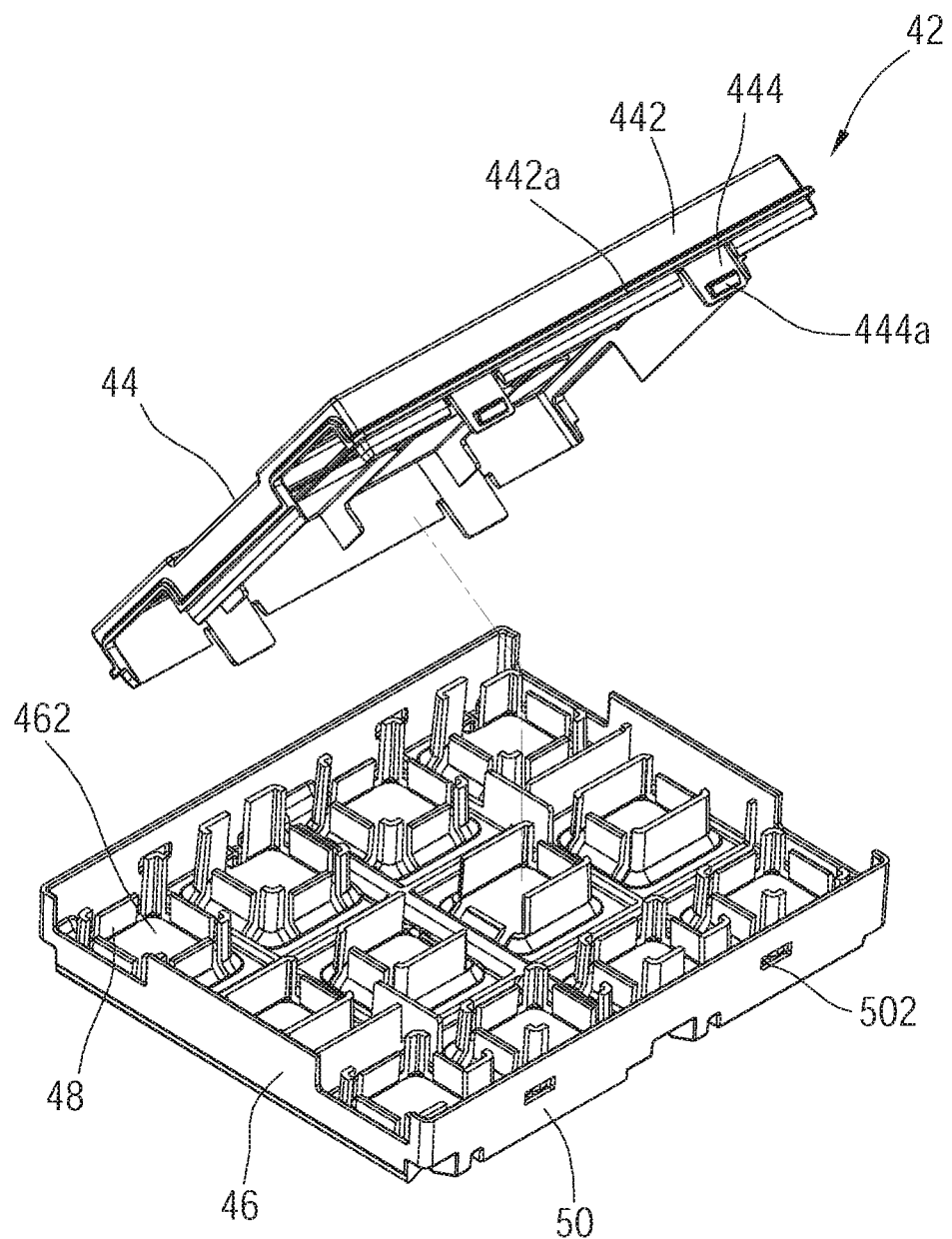
FIG. 10 is an exploded perspective view of the first insulating casing of FIG. 9.
Figure 11:
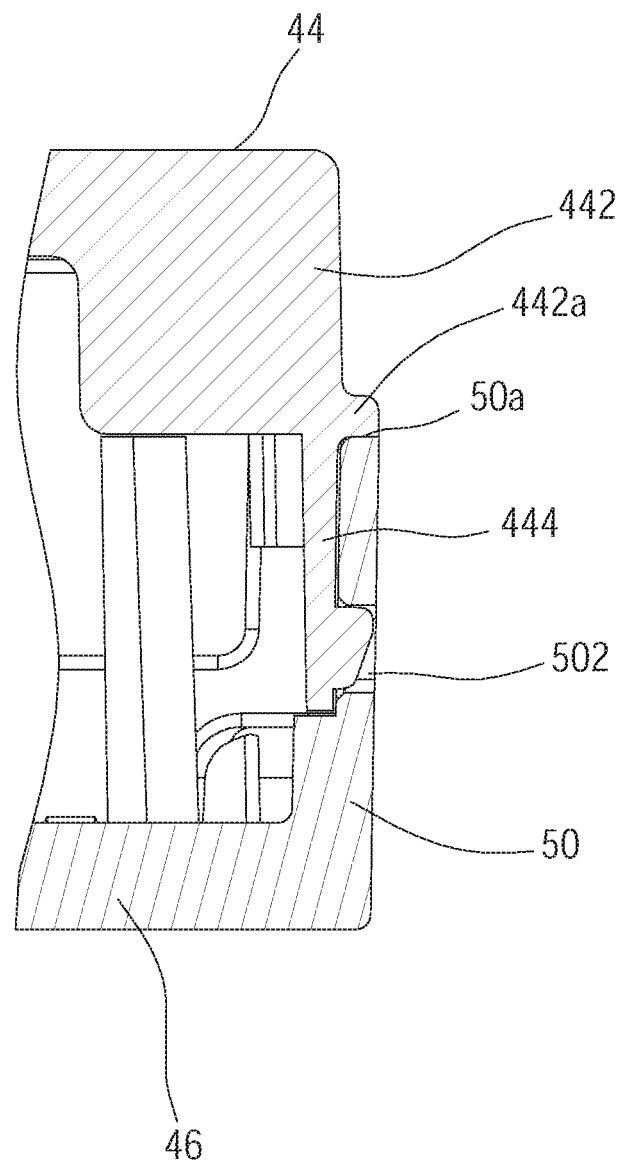
FIG. 11 is a schematic view showing the engagement between the top cover and the base.

As shown in FIG. 9 to FIG. 11, a first insulating casing 42 of a second embodiment according to the present invention has almost the same structure as the first insulating casing 20 of the first embodiment, except that a main body 442 of each of two opposite upper side walls of a top cover 44 provided by this embodiment has a blocking edge 442a and a plurality of extending plates 444 extending downward from the blocking edge 442a, wherein each of the extending plates 444 includes a protrusion 444a which forms a second engaging portion. Each of two opposite lower side walls 50 of a base 46 corresponding to the two opposite upper side walls includes a plurality of recesses 502 which form first engaging portions, and the recesses 502 penetrate through the lower side walls 50 and communicate with an external side and an internal side of the lower side walls 50. When the top cover 44 is engaged with the base 46, the blocking edge 442a would abut against a top edge 50a of the lower side walls 50, and the extending plates 444 would be located in the internal side of the lower side walls 50 such that each of the protrusions 444a of the extending plates 444 would be wedged into one of the recesses 502. In addition, the partitions 48 disposed around the peripheral edge of each of the perforations 462 do not have the positioning notch. When the base 46 is engaged with the battery pack 100, the positioning blocks 126 of the terminals 12 would abut against the top edge of the partitions 48, and each of the partitions 48 would be engaged with one of the terminals 12, whereby to prevent the insulating casing 42 from moving in a lateral direction.

As shown in FIG. 12, a second insulating casing 52 provided by this embodiment has a structure similar to the first insulating casing 42 and includes a base 54 and a top cover 56 as well, except that the bottom plate has only six perforations.

According to the illustration mentioned above, the insulating casing for the battery terminals of the present invention could cover the terminals and the conductive sheets of the battery pack effectively, whereby to prevent the terminals and the conductive sheets from being exposed, contaminated, oxidized and even short-circuited.

It must be pointed out that the embodiments described above are only some embodiments of the present invention. All equivalent structures which employ the concepts disclosed in this specification and the appended claims should fall within the scope of the present invention.

What is claimed is:

1. An insulating casing for battery terminals, wherein the insulating casing is adapted to be disposed on a battery pack which has a plurality of terminals, the insulating casing comprising:
   a base, adapted to be engaged with the battery pack and including a bottom plate, wherein the bottom plate has a plurality of perforations penetrating through the bottom plate and communicating with two opposite surfaces thereof; the perforations are adapted to be passed through by the terminals; and
   a top cover, being detachably engaged with the base, wherein a chamber communicating with the perforations is formed between the top cover and the base;
   wherein a plurality of partitions are disposed around a peripheral edge of each of the perforations of the bottom plate, wherein the partitions are located in the chamber between the top cover and the base, and surround each of the perforations of the bottom plate;
   wherein the insulating casing comprises a plurality of insulating layers, each insulating layer is formed around one of the terminals and integrally includes at least one positioning block; the at least one positioning block abuts against at least a part of the partitions to fix the base on the battery pack and prevent the insulating casing from moving in a lateral direction; the plurality of insulating layers pass through the perforations.

2. The insulating casing for the battery terminals of claim 1, wherein at least a part of the partitions have at least one positioning notch, each of which is recessed in a direction from a top edge of the corresponding partition toward the bottom plate; the at least one positioning block respectively abuts against the corresponding positioning notch.

3. The insulating casing for the battery terminals of claim 1, wherein the base further has two opposite lower side walls connected to the bottom plate, and each of the two opposite lower side walls has at least one first engaging portion; the top cover further has two opposite upper side walls corresponding to the lower side walls, and each of the two opposite upper side walls has at least one second engaging portion to be engaged with the at least one first engaging portion of the lower side walls.

4. The insulating casing for the battery terminals of claim 3, wherein the at least one first engaging portion is one of a protrusion and a recess, and the at least one second engaging portion is another one of the protrusion and the recess.

5. The insulating casing for the battery terminals of claim 4, wherein each of the two opposite upper side walls includes a main body and at least one extending plate, wherein the main body has a blocking edge, and the at least one extending plate extends downward from the blocking edge and includes a protrusion which forms the at least one second engaging portion; each of the two opposite lower side walls includes at least one recess which forms the at least one first engaging portion; the blocking edge respectively abuts against the lower side walls, and the at least one extending plate is located in an internal side of the lower side walls, and the protrusion is wedged into the at least one recess.

6. The insulating casing for the battery terminals of claim 4, wherein each of the two opposite upper side walls includes a main body and at least one extending plate, wherein the at least one extending plate extends downward from the main body and includes a recess which forms the at least one second engaging portion; an external side of each of the two opposite lower side walls includes at least one protrusion which forms the at least one first engaging portion; each of the two opposite upper side walls respectively abuts against the lower side walls, and the at least one extending plate is located in the external side of the lower side walls, and the at least one protrusion is wedged into the recess.

* * * * *